ns that are driven in turn in relative opposite directions about upwardly extending axes, towards one another to pass crop between them. Outwardly extending tines on the rake members define circular paths that intersect or are closely adjacent one another during operation. Beginning at the front of the rake members, with respect to the normal direction of travel, a pair of crop feeders are positioned to guide crop between the rake members and towards the intersecting paths of their tines. The feeders comprise downwardly extending elements that can be curved or configured to shed crop adjacent the ground, near the rotating tines. Further feeders of similar structure are positioned to the rear of the forward pair but within the paths traced by the tines, when viewed in plan. The feeders can be adjustable in a vertical direction and/or deflectable against spring opposition to accommodate heavy crop. The feeders can be a screen or a row of resilient rods or wheels with teeth, any of which can be pivoted to the machine frame.

United States Patent [19]

Mulder

[11] 4,062,173

[45] Dec. 13, 1977

[54] HAY-MAKING MACHINES

[75] Inventor: Herman Mulder, Wateringen, Netherlands

[73] Assignee: C. van der Lely N. V., Maasland, Netherlands

[21] Appl. No.: 670,407

[22] Filed: Mar. 25, 1976

[51] Int. Cl.² ............................................. A01D 79/00
[52] U.S. Cl. ....................................................... 56/370
[58] Field of Search .................. 56/370, 377, 365, 366

[56] References Cited

FOREIGN PATENT DOCUMENTS

| 244,670 | 1/1966 | Austria ................................. 56/370 |
| 2,449,413 | 4/1975 | Germany .............................. 56/370 |
| 2,065,379 | 6/1970 | Germany .............................. 56/370 |

Primary Examiner—Russell R. Kinsey
Attorney, Agent, or Firm—Mason, Mason & Albright

[57] ABSTRACT

A haymaking machine has a pair of rotatable rake mem-

33 Claims, 10 Drawing Figures

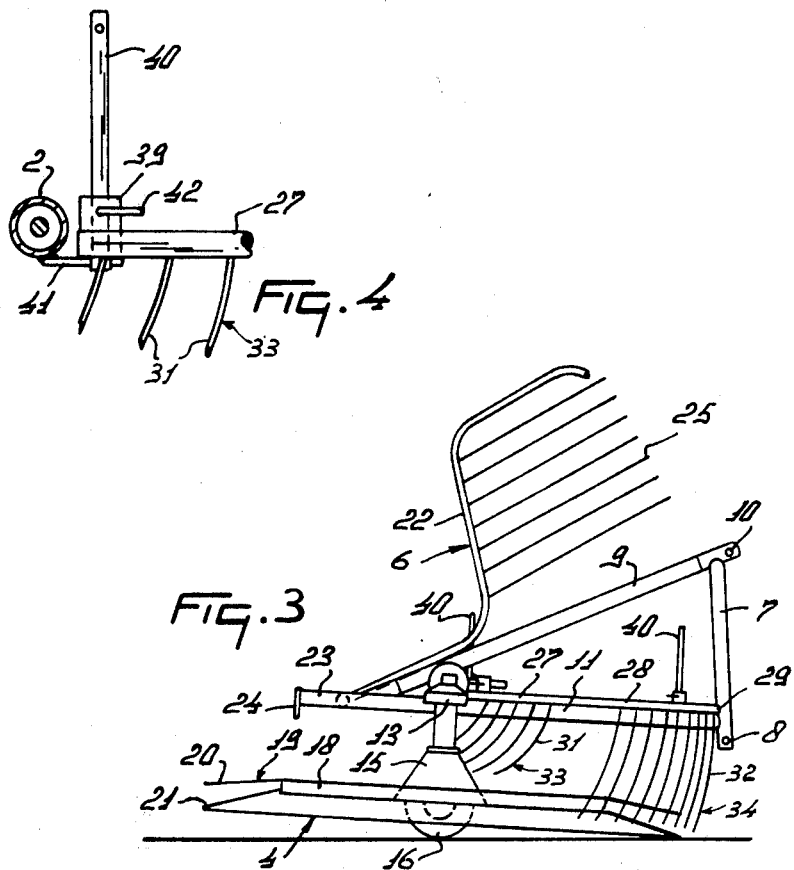

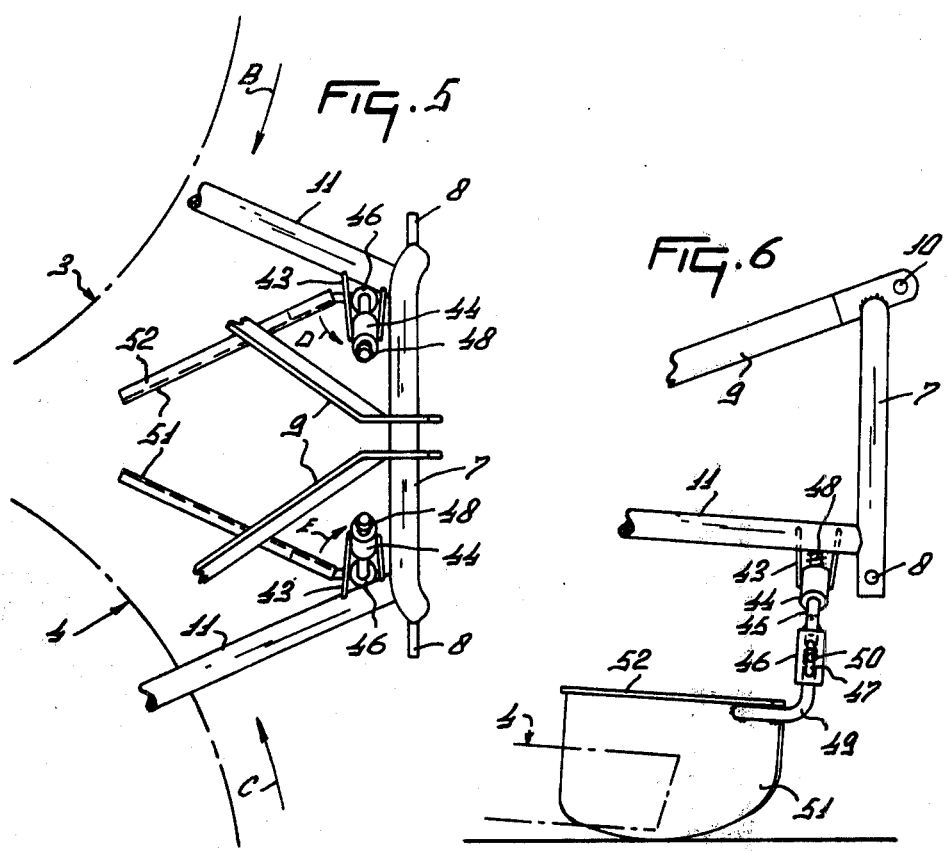
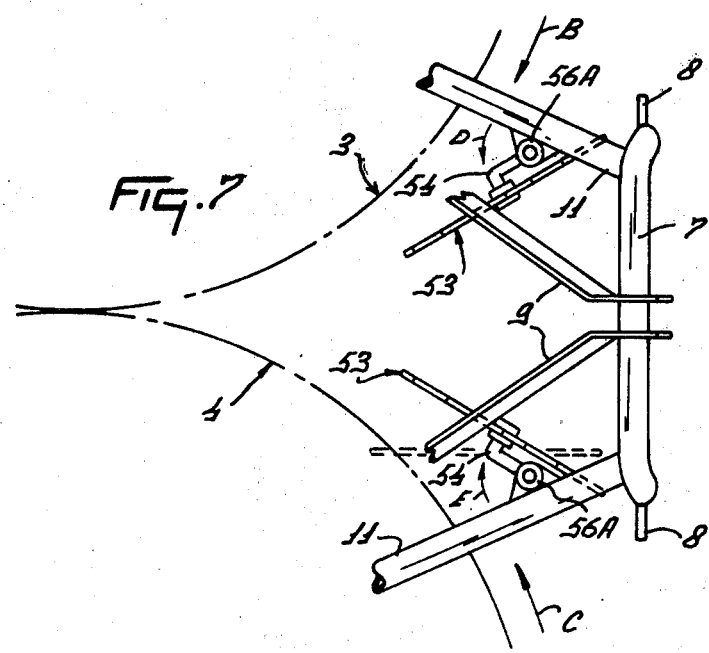

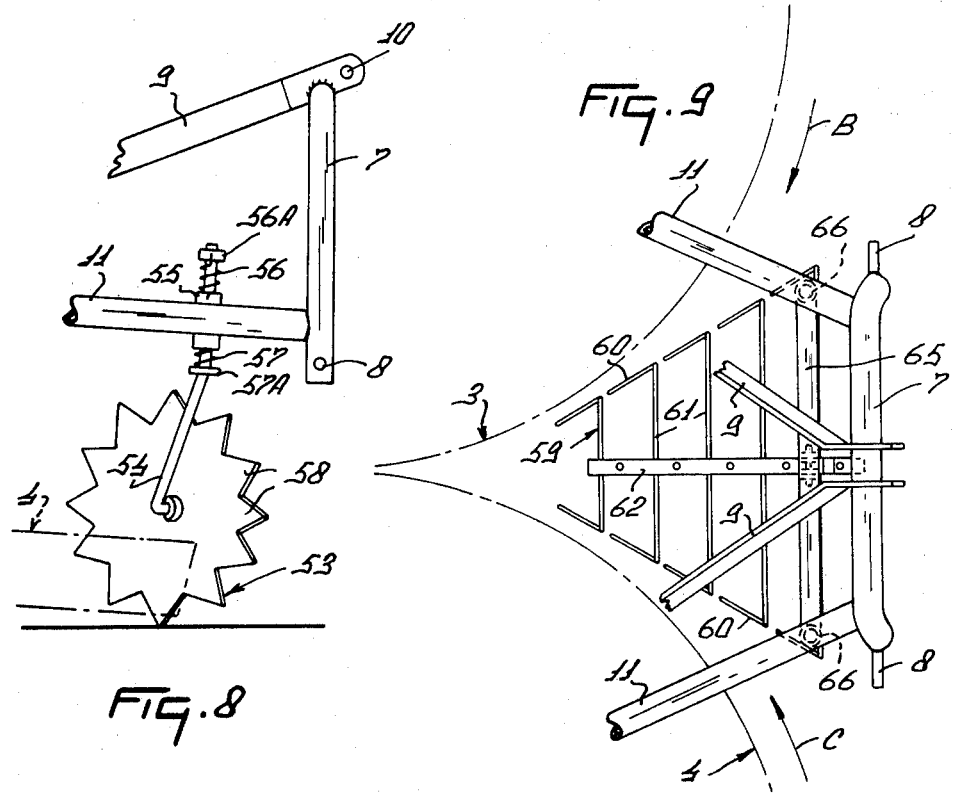
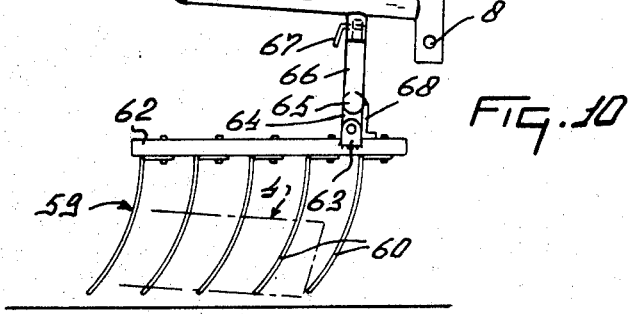

HAY-MAKING MACHINES

For a better understanding of the invention, and to show how the same may be carried into effect, reference will now be made, by way of example, to the accompanying drawings, in which.

Figure 1:
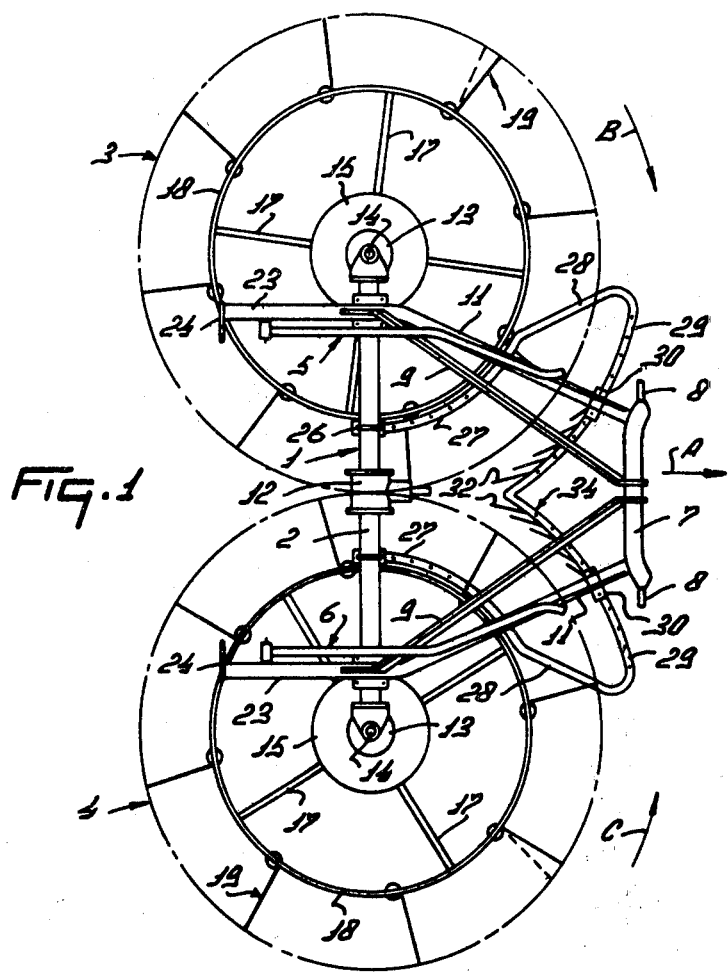
FIG. 1 is a plan view of a haymaking machine in accordance with the invention.
Figure 2:
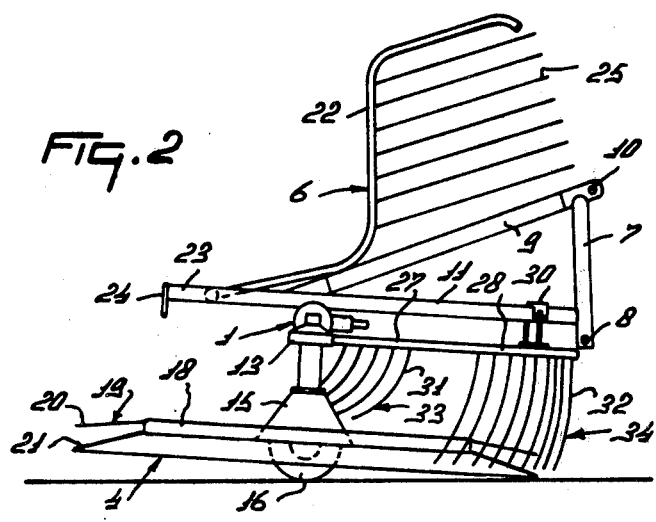
FIG. 2 is a side elevation of the machine of FIG. 1.

FIG. 3 is a side elevation of a machine comprising an alternative embodiment of some parts of the machine of FIGS. 1 and 2, FIG. 4 is a part-sectional elevation showing some members that can be seen in FIG. 3 to an enlarged scale and in greater detail, FIG. 5 is a plan view of a leading region of a machine in accordance with the invention provided with a further alternative embodiment of certain parts, FIG. 6 is a side elevation corresponding to FIG. 5, FIG. 7 is a plan view that is similar to FIG. 5 but that illustrates a further alternative embodiment of certain parts, FIG. 8 is a side elevation corresponding to FIG. 7, FIG. 9 is a plan view similar to FIGS. 5 and 7 but illustrating a still further alternative embodiment of certain parts of the machine, and FIG. 10 is a side elevation corresponding to FIG. 9.

Referring to FIGS. 1 and 2 of the accompanying drawings, the haymaking machine that is illustrated has a mobile frame that is generally indicated by the reference 1, said frame 1 comprising a beam 2 that extends substantially horizontally transverse, and normally substantially horizontally perpendicular, to the intended direction of operative travel of the machine which is indicated in FIG. 1 by an arrow A. Two rake heads, rake wheels or rake members 3 and 4 (hereinafter referred to only as "rake members") are arranged so as to be rotatable about corresponding substantially vertical, or at least upright, axes that are disposed in substantially parallel relationship at the opposite ends of the beam 2, the arrangement being such that, during operation, the rake member 3 rotates in the direction B shown in FIG. 1 of the drawings while the rake member 4 rotates in the opposite direction C. Crop guide members in the form of swath boards 5 and 6 are indirectly connected to the frame beam 2 and, when the machine is to be used for tedding and like crop spreading operations, the swath boards 5 and 6 are disposed in upwardly tilted inoperative positions in which they lie above the rake members 3 and 4 respectively as is illustrated in FIG. 2 of the drawings in respect of the swath board 6 and the corresponding rake member 4. The machine can, however, also be used in the formation of swaths and windows and in like hay and other crop collecting operations and, under such circumstances, the swath boards 5 and 6 are tilted downwardly into effective positions in which the greater parts thereof are located just behind the rake members 3 and 4 with respect to the direction A where they will guide crop displaced by those members 3 and 4 into a more or less compact swath or windrow that extends parallel to the direction A substantially midway across the width of the machine. The front of the machine with respect to the direction A is provided with a coupling member or trestle 7 that is in the form of a tubular beam of substantially inverted U-shaped configuration. Substantially horizontally aligned pins or like fastening means 8 are arranged at the bottom of the coupling member or trestle 7 for pivotal co-operation with the free ends of the lower lifting links of a three-point lifting device or hitch carried by an agricultural tractor or other operating vehicle. Two strips 9 diverge downwardly and rearwardly, with respect to the direction A, from an uppermost region of the coupling member or trestle 7 and their leading uppermost ends afford a forked bracket which is formed with substantially horizontally aligned holes 10 or with other equivalent upper fastening means to enable the bracket to co-operate with the free end of the upper adjustable lifting link of the same three-point lifting device or hitch that co-operates with the pins or like lower fastening means 8.

Two tubular supports 11 diverge rearwardly, as seen in plan view (FIG. 1), from locations that are near to the lowermost ends of the two limbs of the coupling member or trestle 7, the supports 11 being fastened to the top of the frame beam 2 at locations close to the rotary mountings of the two rake members 3 and 4 respectively. It will be noted from the drawings that the rearmost ends of the two strips 9 are, in turn, fastened to the tops of the corresponding tubular supports 11 at locations substantially immediately above the fastening points of those supports 11 themselves to the frame beam 2. The frame beam 2 is of hollow tubular formation and, midway along the length thereof, a gear box 12 is provided with gear box 12 comprises a substantially horizontally diposed rotary input shaft whose splined or otherwise keyed end projects forwardly in substantially the direction A for connection to the power take-off shaft of the agricultural tractor or other vehicle that moves and operates the machine by way of an intermediate telescopic transmission shaft (not shown) that is of a construction which is known per se and which has universal joints at its opposite ends.

The gear box 12 has two substantially horizontally aligned output shafts that are not visible in FIGS. 1 and 2 of the drawings but one of which can be seen, unreferenced, in FIG. 4, said output shafts extending substantially axially lengthwise through the interior of the hollow tubular frame beam 2. The two output shafts form driving shafts for the corresponding rake members 3 and 4. The opposite ends of the frame beam 2 have gear boxes 13 fastened to them and these gear boxes 13 accommodate corresponding bevel pinion transmissions that are of a construction which is basically known per se and which act to drive corresponding hollow shafts 14 about axes that, during operation of the machine, are substantially, but not strictly, vertical. The longitudinal axes of the two hollow shafts 14 are also the axes of rotation of the two rake members 3 and 4. The precise inclination of each axis relative to a horizontal ground surface can be adjusted, for operating purposes, by shortening or lengthening the upper adjustable lifting link of the three-point lifting device or hitch of the operating agricultural tractor or other vehicle in a manner which is known per se. Each hollow shaft 14 is provided, towards its lower end, with a corresponding hub 15 and the bottom of each hub 15 opens downwardly to form a housing for a corresponding rotatable ground wheel 16. The axle of each ground wheel 16 is connected to a corresponding non-rotary shaft that extends axially upwards through the hollow interior of the corresponding shaft 14. A lower region of each ground wheel 16 projects from the bottom of the housing that is afforded by the corresponding hub 15 and it is preferred, but is not essential, that the shafts which extend axially through the hollow shafts 14 should be axially adjustable in position relative to the latter thus enabling the wheels 16 to be raised, or lowered, as may be desirable, with respect to the hubs 15.

Four spokes 17 project substantially radially outwardly from a lower region of each hub 15 at 90° intervals around the corresponding axis of rotation and the outer ends of each set of four spokes 17 are connected to a corresponding circular felly 18 that is contained in a plane which is perpendicular to the axis of rotation of the corresponding rake member 3 or 4. The geometric centers of the circular fellys 18 are coincident with the axes of rotation of the corresponding rake members 3 and 4. If desired, the fellys 18 may be replaced by cylindrical housings (not shown) fixedly connected to the hollow shafts 14 in such a way that those shafts coincide with the longitudinal axes of the housings.

Each felly 18 is provided, in a manner that is basically known per se, with eight tine groups 19 that are spaced apart from one another at regular 45° intervals around the corresponding axis of rotation. Each tine group 19 comprises an upper spring steel tine 20 and a lower spring steel tine 21, the two tines being in register, one above the other, in a direction parallel to the corresponding axis of rotation. The tines 20 and 21 project outwardly from the corresponding felly 18 in a more or less radial direction, at least when the machine is in operation. The tines 20 and 21 are substantially, but usually not strictly, horizontally disposed, their inclinations to the horizontal varying during operation of the machine due to the fact that the axes of rotation of the rake members 3 and 4 are not strictly perpendicular to the ground surface at such times (see FIG. 2 of the drawings). There are, however, often occasions when angles of only very small magnitude are enclosed between the longitudinal axes of the tines and the ground surface. It is most desirable that the positions of the tine groups 19 relative to the fellys 18 should be adjustable to suit tedding and like operations or to suit swath or windrow forming and like operations. Accordingly, the mounting (not illustrated in the drawings in detail) of the tine groups 19 are so constructed and arranged that, for tedding and like crop spreading operations, the tines 20 and 21 are strictly radially disposed relative to the corresponding axes of rotation when viewed in a direction parallel to those axes or are inclined forwardly with respect to the directions B and C by a very few degrees so as to "lead" to a small extent in said direction B and C. This condition is shown in full lines in respect of all of the tine groups 19 in FIG. 1 of the drawings. When, however, a swath or window forming or other crop collecting operation is to be performed, the tine groups 19 are adjusted relative to the fellys 18 so that their tines are inclined rearwardly by a few degrees from root to tip with respect to radial lines, and with respect to the corresponding directions of rotation B and C, so that said tines are in "trailing" positions. Such a condition is illustrated in broken lines in FIG. 1 of the drawings in respect of only one tine group 19 of each of the two rake members 3 and 4. The outermost free ends or tips of the tines 20 and 21 follow circular paths during the operation of the machine and those circular paths are illustrated in irregularly broken lines in FIGS. 1 and 2 of the drawings. It is preferred that the circular paths that correspond to the two rake members 3 and 4 should not more than just intersect one another centrally across the width of the machine as is illustrated in FIG. 1 of the drawings but it is not significantly disadvantageous if the two circular paths overlap one another by a small percentage of the total working width. The combined working width of the two rake members 3 and 4 may be between substantially 2 and substantially 4 meters, a magnitude of substantially 3 meters being preferred.

Substantially rigid or bearing portions of the two swath boards 5 and 6 are afforded by corresponding tubular support beams 22 that are connected by corresponding substantially horizontal pivot pins to corresponding arms 23 that are afforded by rear portions of the tubular supports 11, said arms 23 being, however, in substantially parallel relationship with one another and with the direction A. As previously mentioned, the swath boards 5 and 6 are not used for tedding and like crop spreading operations and, under these circumstances, the tubular support beams 22 are turned upwardly and forwardly about their pivotal connections to the arms 23 to bring them to the positions that are illustrated in FIGS. 1 and 2 of the drawings. The tubular support beams 22 then bear downwardly upon the upper edges of the corresponding strips 9. When, on the other hand, a swath or windrow forming or like crop collection operation is in progress, the swath boards 5 and 6 are tilted downwardly and rearwardly about their pivotal connections to the arms 23 and parts thereof can then slide over the ground surface, any undulations that may be met with in that ground surface being matched without difficulty because the swath boards 5 and 6 can turn freely upwardly and downwardly relative to the frame 1 about the axes of the pivotal connections of their tubular support beams 22 to the arms 23. It is, however, desirable that the swath boards 5 and 6 should not be able to turn downwardly to an excessive extent when they are in their effective positions and, to this end, strip-shaped cradles 24 are provided at the rearmost ends of the two arms 23 and afford stops which positively limit the angular extent to which the beams 22 can turn downwardly about their pivotal connections to the arms 23.

The two swath boards 5 and 6 are substantially symmetrically identical and, as seen in FIG. 2 of the drawings, the support beam 22 of the swath board 6 is formed with a bend at a distance from its pivotal connection to the corresponding arm 23, the limbs of the beam at the opposite sides of said bend being inclined to one another at an angle of substantially 100°. The limb of the bend which is remote from the pivotal connection has a plurality of substantially straight and substantially parallel spring steel guide rods 25 secured to it and it will be realised by reference to FIG. 1 of the drawings that, when the swath boards 5 and 6 are in their operative positions (their inoperative positions being illustrated), the rods 25 of the swath board 5 will be in rearwardly covergent relationship with the guide rods 25 of the swath board 6 with respect to the direction A. Beyond the limb of each beam 22 that has the ends of the corresponding guide rods 25 secured to it, said beam is again formed with a substantially 100° bend but it will be seen from FIG. 2 of the drawings that said bend is oppositely directed to the bend that is nearer to the pivotal connection to the corresponding arm 23. Beyond the second bend, each beam 22 comprises a substantially straight limb that is in substantially parallel relationship with the corresponding guide rods 25 and it is this last mentioned limb of each beam 22 that slides over the ground surface when the swath boards 5 and 6 are placed in their effective positions during the operation of the machine. The extreme free ends of the beams 22 are bent over to some extent towards the corresponding rods 25 but, normally speaking, remain spaced by small distances from the free ends of the most closely adjacent rods 25. This tends to avoid the free ends of the beams 22 penetrating into the ground surface during manoeuvring of the machine with its swath boards 5 and 6 in their effective positions, the immediately adjacent straight limbs of the beams 22 being in substantially parallel and sliding relationship with the ground surface at such times.

Brackets 26 depend from the beam 2 at equal distances from the opposite sides of the central gear box 12 and arcuately curved tubes 27 are carried by the two brackets 26, said tubes 27 being located, as seen in the plan view of FIG. 1, in close proximity to the fellys 18 of the corresponding rake members 3 and 4. Each tube 27 extends generally forwardly with respect to the direction A from the corresponding bracket 26 and the geometric center of its arcuate curvature substantially coincides with the axis of rotation of the corresponding rake member 3 or 4. Each tube 27 subtends an angle of substantially 60° at the corresponding axis of rotation. The leading ends of the curved tubes 27 with respect to the direction A are bent over through substantially 40° relative to tangents to said tubes at those points to produce straight tube portions 28 that are substantially horizontally disposed and that diverge forwardly from the leading ends of the curved tubes 27 relative to the direction A. It will be remembered that it is preferred that the ground wheels 16 should be upwardly and downwardly adjustable in position relative to the hubs 15 and, with such a construction, the curved tubes 27 may be very close to the corresponding fellys 18 as seen in the plan view of FIG. 1. In dependence upon the extent of this adjustability that is provided, the tubes 27 are preferably spaced from the corresponding fellys 18 (as seen in FIG. 1 of the drawings) by a distance which may advantageously be between substantially 20% and substantially 50% of the length of an effective portion of one of the tines 20 or 21. It will be appreciated that the upward and downward adjustability of the ground wheels 16 relative to the hubs 15 moves the corresponding rake members 3 and 4 further away from, or closer to, the ground surface.

Where, as seen in plan view (FIG. 1), the straight tube portions 28 project forwardly beyond the paths that are traced by the outermost free ends or tips of the tines 20 and 21 during operation of the machine, said tube portions 28 are bent over towards one another to form curved tube portions 29. The bends that integrally interconnect the straight tube portions 28 and the curved tube portions 29 are located, as seen in FIG. 1, forwardly (with respect to the direction A) of the leading and lowermost regions of the paths that are traced by the tips of the tines 20 and 21 during the operation of the machine. Each curved tube portion 29 is of arcuate formation, its center of curvature being substantially coincident with the corresponding axis of rotation and having a curved length which is such that it subtends an angle of substantially 50° at that axis. The two curved tube portions 29 extend, from the bends by which they are integrally connected to the corresponding tube portions 28, rearwardly with respect to the direction A towards a vertical plane of substantial symmetry of the machine that is parallel to the direction A. The rearmost ends of the two curved portions 29 are welded or otherwise rigidly secured to one another at the imaginary plane which has just been mentioned and, accordingly, the assembly of two curved tubes 27, two straight tube portions 28 and two curved tube portions 29 is disposed symmetrically, or substantially symmetrically, with respect to that plane. Each curved tube portion 29 is suspended from the corresponding overlying support 11 by a corresponding bracket 30. The two arcuately curved tubes 27, the two straight tube portions 28 and the two curved tube portions 29 are contained in a plane that is perpendicular or substantially perpendicular to the axes of rotation of the two rake members 3 and 4. The distance between each curved tube portion 29 and the circular path that is described by the tips of the tines 20 and 21 of the corresponding rake member 3 or 4 is, measured in a radial direction from the axis of rotation concerned, between substantially 5% and substantially 20% of the overall diameter of one of the rake members 3 and 4. A magnitude of substantially 10% of said overall diameter is, in fact, preferred. The magnitude of the distance which has just been discussed governs the distance by which the junction between the two curved tube portions 29 is spaced from the central gear box 12 as seen in plan view (FIG. 1).

The bottom of each arcuately curved tube 27 is provided at regular intervals throughout all or most of its length with a plurality of crop guiding elements that may conveniently be in the form of spring steel rods 31. Although conveniently made from spring steel, the rods 31 should be of quite low flexibility and may, if desired, even be of substantially non-flexible formation. In the machine that is being described with reference to FIGS. 1 and 2 of the drawings, each arcuately curved tube 27 carries five of the spring steel rods 31 but this number is by no means essential and a greater or lesser number of the rods 31 per tube 27 may equally well be provided in accordance with the size of the machine and/or the nature and condition of the hay or other crop with which it is to deal. In any case, each assembly of the rods 31 defines a corresponding single skeletal guide surface for hay and other crop which, despite its open nature, is substantially as effective in guiding crop as would be a closed surface because of the nature of hay and the like. Each rod 31 extends downwardly from the bottom of the corresponding tube 27 and is preferably curved rearwardly with respect to the direction A (see FIG. 1). Each rod 31 is preferably also curved in such a way that, as seen in plan view (FIG. 1), its center of curvature is substantially coincident with the axis of rotation of the corresponding rake member 3 or 4. This is not, however, essential and the rods 31 may extend tangentially with respect to circles centered upon the axes of rotation of the rake members 3 and 4 when the machine is seen in plan view (FIG. 1). The rods 31 extend downwardly to points that are spaced above the corresponding upper tines 20 by distances that are dependent upon the height settings of the rake members 3 and 4 relative to the ground surface and upon the settings of the tubes 27 relative to the corresponding fellys 18. Each set of spring steel rods 31 affords a corresponding curved crop feeder 33 which is located above a corresponding one of the two rake members 3 and 4.

Each of the two curved tube portions 29 is also provided beneath with a plurality of substantially regularly spaced apart crop guiding elements that are conveniently in the form of spring steel rods 32. There are preferably about ten of the rods 32 in respect of each tube portion 29 but, like the rods 31, a greater or smaller number of the rods 32 may be provided when the size of the machine ad/or operating circumstances make that desirable. Those rods 32 that are located substantially foremost with respect to the direction A and therefore close to the lowermost regions of the circular paths that are traced by the tips of the lower tines 21 during the operation of the machine are only very gently curved and may be considered as being substantially parallel to the corresponding axis of rotation. However, moving along the tube portions 29 towards the junction between the two of them, the successive rods 32 become progressively more curved in a downward and rearward direction from root to tip. Moreover, as can be seen in FIG. 1 of the drawings, all of the rods 32 are inclined downwardly from root to tip towards the imaginary substantially vertical plane of symmetry of the machine that contains the junction between the two curved tube portions 29 and that is parallel to the direction A. As seen in FIG. 1 of the drawings, each of the rods 32 is inclined to that imaginary plane (not shown) by an angle of between substantially 20° and substantially 50°, the rods 32 that are nearest to said plane being less steeply inclined thereto than are the rods 32 that are furthest therefrom. Each set of spring steel rods 32 affords a corresponding curved crop feeder 34 which is located in front of the corresponding rake member 3 or 4 with respect to the direction A. The two rearmost rods 32, with respect to the direction A, that are closest to the junction between the two curved tube portion 29 are preferably spaced apart from one another by a distance which has a magnitude that is equal to substantially 5% of the overall diameter of one of the two rake members 3 and 4.

The rods 32 all extend downwardly to terminate at points above the ground surface, it being advantageous to maintain some small spacing between their tips and the ground surface because this considerably minimises the tendency for loose hay and other crop to get caught around the free ends of the rods. The more or less curved configurations of the rods 32 and their relative positions are such that the two crop feeders 34 together act in the general manner of a funnel through which will pass crop located on the aforementioned imaginary plane of substantial symmetry of the machine and crop disposed fairly close to the opposite sides of that plane, the crop moving rearwardly between the rake members 3 and 4 with respect to the direction A. If desired, all of the spring steel rods 32 may be of the same length but it is, in fact, advantageous that those rods 32 which are closer to the imaginary plane of symmetry of the machine should be slightly greater in length than those which are further from that plane. With such an arrangement, the slightly longer and more centrally disposed rods 32 have somewhat greater resiliency than do the other rods 32.

The two curved crop feeders 33 are convergent rearwardly with respect to the direction A and so are the two curved crop feeders 34. The crop feeders 33 and 34 are mounted on the machine in such a way that the surfaces which they skeletally define will function in an equivalent manner to closed guide surfaces having regard to the nature of hay and like crops and to the directions in which such crops will encounter the feeders 33 and 34 during the use of the machine. It will be noted from the drawings that the crop feeders 33 are located substantially wholly behind the crop feeders 34 with respect to the direction A and it is most desirable that the latter feeders 34 should always be at least partly in advance of the feeders 33 with respect to that direction.

When the machine is in use, its coupling member or trestle 7 is connected to the three-point lifting device or hitch or an agricultural tractor or other operating vehicle and the rotary input shaft of the gear box 12 is placed in driven connection with the power take-off shaft of the same agricultural tractor or other vehicle by way of the aforementioned known intermediate telescopic transmission shaft that has universal joints at its opposite ends. Upon rotating the power take-off shaft of the tractor or other vehicle, the transmission members that extend between the gear box 12 and the hollow shafts 14 cause the two rake members 3 and 4 to revolve in the opposite directions B and C. Planes that contain the outermost free ends or tips of the lower tines 21 of the tine groups 19 should, during operation of the machine, be inclined to the ground surface by angles of not less than substantially 3° and not more than substantially 10°, an inclination of substantially 5° being preferable. Each time group 19 may, if desired, be mounted so as to be tiltable upwardly with respect to the corresponding felly 18 to avoid damage by obstacles and/or to enable the machine to be placed in an inoperative transport position of reduced width by tilting all of the groups 19 upwardly and fixing them in such displaced positions. This is not, however, essential and, if preferred, the tine groups 19 may be substantially fixed in position reltive to the corresponding fellys 18. The beam 2 will normally, as illustrated in FIGS. 1 and 2 of the drawings, extend substantially horizontally perpendicular to the direction A but this is not essential and the machine may be so arranged that the beam 2 is obliquely inclined to the direction A.

Owing to the inclined positions of the planes of rotation of the rake members 3 and 4, the tines 20 and 21 thereof that are in leading and lower arcs of the two rake members will engage and pick up most of the hay or other crop that is met with rather than tines that are located, at any given instant during operation, at other angular positions about the axes of rotation of the rake members 3 and 4. It frequently occurs that some hay or other crop is shed or ejected from the tines 20 and 21 too soon and, consequently, in an incorrect direction. Usually, such prematurely shed crop is picked up by the other rake member of a co-operating pair in a machine that is basically similar to the machine that has been described but that is not constructed in accordance with the present invention, the crop then being thrown back again towards the rake member which first displaced it. This can, and frequently does, lead to the formation of entangled crop and to worsening of the entanglement of crop that was already in such a condition before ever being displaced by the haymaking machine. An entangled mass of crop can be thrown to and fro between two rake members several times and generally becomes enlarged as it does so in a manner reminiscent of that of a rolling snowball. Experience has shown that machines of large working width and machines that are arranged to travel at a relatively high operative speed are considerably more prone to suffer from this disadvantage than are narrower and slower travelling machines. A very small inclination of the planes of rotation of the rake members to the ground surface and the provision thereof with tines that are also inclined at only small angles to the ground surface tends further to aggravate the problem. As a generalisation, it may be said that the disadvantage under discussion is particularly prevalent in machines that have rake members whose tines have only a light or slack grip upon picked up hay or other crop as they move that hay or other crop through arcs of the rake members concerned. Since cut hay and like crop is a very non-uniform material, it is virtually impossible to avoid the formation of entangled masses thereof altogether but, nevertheless, a very useful reduction in crop entanglement can be produced if reciprocation of prematurely ejected masses of crop between the rake members, as discussed above, can be substantially prevented and if already entangled crop that may be met with during operation of the machine can be fed to the two co-operating rake members thereof at a location close to a vertical plane of substantial symmetry that extends between them. In the central region between two co-operating rake members such, for example, as the rake members 3 and 4 that have been described, the opposed tines of the two members co-operate with one another to produce a combing or carding action that tends to disentangle supplied crop or at least to minimise the entanglement thereof. This disentangling effect is at its best when the two co-operating rake members are spaced apart from one another in the central region between them by a small distance, just intersect one another, or overlap to only a very small extent. These relationships refer to the circles that are traced by the tips of the tines of the rake members during revolution of the latter. At least one pair of crop feeders 33 or 34 is provided in accordance with the present invention and these crop feeders ensure that most entangled crop is supplied to the tine groups 19 of the rake members 3 and 4 in close proximity to the imaginary vertical plane of substantial symmetry of the machine that extends substantially parallel to the direction A or, when the frame beam 2 is in obliquely inclined relationship with that direction, substantially perpendicular to the longitudinal axis of the frame beam 2.

The curved crop feeders 33 and 34 are preferably of at least partly resilient construction and, with this preferred structure, hay or other crop which bears against them rarely adheres to their rods 31 and 32 but tends to slide downwardly towards the free ends of those rods under the action of gravity, the vibration of the machine and the downward and rearward curvature of the rods. Moreover, as discussed above, the rods 31 and 32 are orientated towards the imaginary plane of substantial symmetry of the machine and thus also guide crop which slides downwardly along them towards that plane. When the feeders 33 and 34 are, as is preferred, afforded principally by the spring steel rods 31 and 32, they are of at least partly flexible formation and the operation of the machine is not adversely affected to any significant extent even when the machine continues to operate while travelling through quite steep bends.

The curved crop feeders 34 that are located in front of the rake members 3 and 4 with respect to the direction A in such positions that their centers of curvature substantially coincide with the axes of rotation of the corresponding members direct crop which they engage towards the imaginary plane of substantial symmetry of the machine. The rearwardly convergent disposition of the crop feeders 34 guides hay or other crop effectively towards the imaginary plane of symmetry of the machine while the feeders 33 are effective in engaging principally that crop which might otherwise be thrown over the tops of the tine groups 19 and generally towards the centers of the rake members 3 and 4. Due to the rearwardly convergent disposition of the crop feeders 33, hay or the like that is engaged by them is guided rearwardly with respect to the direction A towards said plane of symmetry. The tendency for crop to become caught up with the hubs 15, ground wheels 16 and/or spokes 17 is thus very small and any entangled mass of crop that is guided by the feeders 33 into engagement with the tines 20 and 21 in the region of the plane of symmetry of the machine is disentangled by those tines or at least has its degree of entanglement reduced to some extent in the general manner that has already been discussed above. When the machine is disposed to form swaths or windrows or for a similar crop collection operation, the rearwardly converging feeders 33 and 34 act to facilitate the formation of a uniform swath or windrow of sharply defined non-ragged cross-sectional configuration. In fact, under some operating conditions, an entirely satisfactory swath or windrow can be produced by the machine without it being necessary to tilt the swath boards 5 and 6 downwardly into their effective positions, the feeders 33 and 34 alone being sufficient to ensure that the rake members 3 and 4 will form a swath or windrow of the required width.

As previously discussed, the feeders 33 and 34 constitute, for hay and like materials, essentially closed guide surfaces and thus very little, if any, hay or other crop that is prematurely shed by the tines 20 and 21 or that is thrown too high in the air hereby gets between the two feeders 33 and 34 that correspond to each rake member 3 and 4 respectively. The guide surfaces that are afforded by the feeders 33 and 34 extend, effectively, only through regions of the rake members 3 and 4 in which crop has already been picked up by the tines 20 and 21 and is being carried in either the direction B or the direction C by those tines, that is to say, between locations that are a little in advance, with respect to the direction A, of points that are just in front of the leading and lowermost location on the circles that are traced by the tips of the lower tines 21 during operative rotation of the rake members 3 and 4 (see FIG. 2) and locations which, as seen in plan view (FIG. 1), are in register with the transverse frame beam 2. The disposition of the feeders 33 and 34 is such that the tines 20 and 21 can deflect freely upwards and downwards where their mounting is such as to allow them to do so without any danger of fouling the rods 31 and 32.

FIGS. 3 and 4 of the drawings illustrate an embodiment in which the crop feeders 33 and 34 can be adjusted to, and retained in, a plurality of different height setting relative to the frame. The tubes 27 and tube portions 29 are mounted above the supports 11, the tubes 27 being provided, at substantially their rearmost ends with respect to the direction A, with substantially vertical sleeves 39 (FIG. 4) that slidably surround corresponding tubes 40 that extend substantially parallel to the axes of rotation of the rake members 3 and 4. The lower ends of the tubes 40 are rigidly connected by brackets 41 to the frame beam 2. The tube portions 39 are similarly provided with sleeves that are upwardly and downwardly slidable along tubes 40 (FIG. 3) carried by the corresponding supports 11. The sleeves 39 can quickly be engaged with, or disengaged from, the upper ends of the tubes 40 and any convenient known means 42, such as a horizontal locking pin or a clamping set screw, may be employed to maintain each sleeve 39 at a chosen level relative to the corresponding tube 40 and thus the four feeders 33 and 34 at a chosen level relative to the frame 1 and to the rake members 3 and 4. The embodiment that is illustrated in FIGS. 3 and 4 of the drawings has the advantage that the position of the feeders 33 and 34 can be regulated having regard to the nature and condition of the crop that is to be worked. For example, different operating problems occur when dealing with very heavy accumulations of hay or other crop to those that are encountered when working light accumulations of crop. It is, sometimes, also advantageous to be able to use the machine without employing the crop feeders 33 and 34 and, in the embodiment of FIGS. 3 and 4 of the drawings, the tubes 40 are of such a vertical extent that the sleeves 39 can be slid upwardly to substantially the tops thereof, without removing them from the machine, and this brings the lowermost ends of both the rods 31 and 32 well above the paths of rotation of the corresponding tines 20 and 21. With this construction, the four crop feeders 33 and 34 are upwardly and downwardly adjustable in position in common but, in a further embodiment which is not illustrated, the arcuately curved tubes 27 are not rigidly connected to the curved tube portions 29 and said tubes 27 and tube portions 29 are separately adjustable, upwardly and downwardly, relative to the frame 1, this giving greater facility for adjustment to effect optimum crop working.

In the embodiment of FIGS. 1 and 2 of the drawings, the crop feeders 33 and 34 are adjustable radially with respect to the corresponding rake members 3 and 4 by moving the brackets 26 and 30 lengthwise along the frame beam 2 and the supports 11. FIGS. 3 and 4 of the drawings illustrate vertical adjustment of the crop feeders 33 and 34 and it will be evident that these two adjustments can be combined in one machine so as to give the facility for both radical adjustment and height adjustment. Moreover, if desired, the feeders may be arranged so as to be adjustable in tangential directions with respect to the rake members 3 and 4. It has been found that the crop feeding efficiency of the parts 33 and 34 is at its best when those parts are principally or wholly of a resilient construction. Sometimes, when modifying the machine to deal with different crops and/or different operating conditions, it is advantageous to replace the spring steel rods 31 and 32 by other crop guiding elements and/or to alter the spacing between the elements. Since the crop feeders 33 and 34 are completely disengageable from the frame of the machine, it is also possible to substitute other crop feeders of different formation when changing the mode of operation of the machine and/or the crop that is to be dealt with, such interchange of feeders being capable of being effected very quickly without causing any significant loss of operating time.

FIGS. 5 and 6 of the drawings illustrate a further embodiment in which the relatively facing inner surfaces of the tubular supports 11 carry forked brackets 43 that are directed generally towards one another and major portions of which are located beneath the levels of the corresponding supports 11. Sleeve-like bearing bushes 44 are mounted between the two limbs of each bracket 43 at the outermost and lowermost ends of those brackets, the longitudinal axes of said bushes 44 being inclined to the vertical in downwardly divergent relationship with each axis making an angle of between substantially 20° and substantially 40° with the imaginary plane of symmetry of the machine that has been referred to above. In fact, an inclination of substantially 30° to that plane is preferred. Moreover, the two longitudinal axes are contained in a common plane which is perpendicular, or substantially perpendicular, to the intended direction of operative travel A (FIG. 1) of the machine. Each bush 44 has a corresponding shaft 45 turnably arranged therein, the shafts 45 extending axially downwards beneath the lower ends of the bushes 44 for equal short distances. At or near its lowermost end, each shaft 45 is welded or otherwise rigidly secured to the top of a corresponding cylindrical holder 46, the longitudinal axes of said holder 46 being coincident with, or inclined to those of the corresponding shafts 45 and bushes 44. Each holder 46 has walls with slots 47 that are parallel to the axis of that holder 46. Each shaft 45 projects for a short distance above the upper end of the corresponding bush 44, the upwardly projecting portion having several turns of a corresponding coil spring 48 wound around it, the opposite ends of the coil springs 48 being anchored to the shafts 45 themselves and to the corresponding bushes 44, respectively. The coil springs 48 are arranged to urge the two shafts 45 turnably about their own longitudinal axes in the opposite directions D and E that are indicated by arrows in FIG. 5 of the drawings. Each holder 46 houses one end of a corresponding tube 49, the tubes 49 being movable in directions that are parallel to the longitudinal axes of the corresponding holders 46 but being substantially immovable relative to the holders 46 themselves around those axes. To this end, the upper ends of each tube 49 has a corresponding pin 50 rigidly secured to it, the pins 50 being entered transversely through the slots 47 in the holders 46, with each pin 50 having substantially the same cross-sectional diameter as the widths of the slots 47 with which it co-operates. The pins 50 may be freely movable upwardly and downwardly along the slots 47 or, if preferred, at least one spring may be arranged internally of each holder 46 to urge the corresponding pin 50 towards the lower end of that holder.

At a level which conveniently, but not essentially, is substantially midway between the level of the corresponding support 11 and the ground surface, each tube 49 is bent over through not less than substantially 90° to produce a substantially horizontal portion thereof, the substantially horizontal portions being directed generally rearwardly from the corresponding bends with respect to the direction A. When the coil springs 48 are free to turn the shafts 45 as far as they are able to do so in the directions D and E into limit positions that are defined by stops (not shown), the substantially horizontal portions of the tubes 49 that immediately adjoin the bends in those tubes both extend substantially parallel to the direction A. This condition is illustrated in FIG. 5 of the drawings. However, the substantially horizontal portions in question of the tubes 49 are joined by angular bends to substantially horizontally disposed end portions of said tubes and those end portions extend in rearwardly convergent relationship with respect to the direction A under the circumstances which have just been discussed. The portions of each tube 49 at the opposite sides of each angular bend may conveniently enclose an angle of substantially 150° between them. The free end portion of each tube 49 is substantially perpendicularly inclined to the axis of rotation of the corresponding rake members 3 or 4. The end portions of the tubes 49 are also welded, or otherwise rigidly secured, to corresponding crop feeders 51 in the form of closed screens that may be formed from metal or from a synthetic plastics material. It will be seen from FIG. 5 of the drawings that, when the springs 48 have turned the shafts 45 as far as is possible in the directions D and E, the two crop feeders 51 are rearwardly convergent with respect to the direction A, each feeder 51 being inclined to the imaginary vertical plane of substantial symmetry of the machine by an angle of between substantially 20° and substantially 40° under those conditions, an inclination of substantially 30° being preferred. A gap then exists between the rearmost ends of the two screens 51 which is of just the right width to allow hay or other crop to pass between the two screens substantially lengthwise along said imaginary plane and rearwardly into engagement with the tines of the two rake members 3 and 4. The crop is thus fed to the rake members 3 and 4 at a controlled rate and the tines of those rake members operate in the previously discussed manner to disentangle any entangled accumulations of crop or at least to reduce the entanglement of such accumulations. As seen in side elevation (FIG. 6), each crop feeder 51 is of generally oblong configuration, the lower corners of the oblong being, however, rounded off and the lowermost edge between those corners being of downwardly convex curved configuration. Since each crop feeder 51 is inclined to the direction A at a minimum of substantially 50°, the lower curved edge thereof will slide over the ground surface without difficulty. Each crop feeder 51 may advantageously be stiffened to some extent, particularly when it is of a metallic construction, by forming its upper straight edge with a perpendicularly bent-over rim 52 that preferably, as shown in FIGS. 5 and 6 of the drawings, extends throughout the whole of the length of that edge.

When the machine of FIGS. 5 and 6 of the drawings is in operation, its crop feeders 51 operate in the same general manner as the previously described curved crop feeders 34, accumulations of crop again being substantially prevented from being thrown to and fro between the two rake members 3 and 4. The crop feeders 51 effectively engage the crop and guide it rearwardly between them into a central region of the machine so that the tines of the rake members 3 and 4 engage entangled accumulations of crop substantially on the imaginary vertical plane of substantial symmetry of the machine. When the crop feeders 51 are made from metal sheet, that sheet can be quite thin and, provided that the feeders are of sufficient rigidity, they may extend throughout a considerable fore and aft distance. The rearmost ends of the feeders 51 with respect to the direction A are preferably located substantially immediately in front of the circular paths that are described by the free ends or tips of the tines 20 and 21 of the rake members 3 and 4 during the operation of the machine. Owing to the fact that the shafts 45 are turnable against the opposition of the springs 48 in the bushes 44, the crop feeders 51 that are indirectly supported by said shafts 45, can turn outwardly away from each other in directions opposite to the direction D and E to allow any heavy accumulations of crop to pass between their rearmost ends when the gap between those rearmost ends is not otherwise of sufficient width. This facility prevents any significant stowage of crop building up between the feeders 51. When an accumulation of crop has passed rearwardly between the crop feeders 51 to the tines of the rake members 3 and 4, the springs 48 turn the feeders 51 back in the directions D and E into substantially the position shown in FIG. 5 of the drawings to deal with crop received at a lesser rate per unit time.

When the crop feeders 51 are deflected away from substantially the position illustrated in FIG. 5 of the drawings in directions opposite to the directions D and E, they also move upwardly away from the ground surface to some extent because the shafts 45 are non-perpendicularly inclined to the ground surface. The arrangement is, in fact, such that they move upwardly to a sufficient height to avoid fouling the tines 20 and 21 as might, at first sight, appear to be possible in FIGS. 5 and 6 of the drawings. It will be remembered that, as well as being pivotably mounted, the crop feeders 51 are upwardly and downwardly displaceable relative to the holders 46 and this enables their lower edges readily to follow any undulations in the surface of the ground that may be met with during the forward progress of the machine. As previously mentioned, the pins 50 may be freely movable in the slots 47 and this is adequate when the feeders 51 are of a heavy construction but, when feeders 51 of light weight are employed, the provision of springs in the holders 46 is desirable. Such springs may advantageously be compression springs arranged to urge the pins 50 towards the lowermost ends of the slots 47. The provision of the crop feeders 51 is particularly advantageous when a tedding or like crop spreading operation is to be performed because the feeders act to prevent the machine from itself causing crop entanglements and to disentangle or reduce the degree of entanglement of any already entangled masses of crop that may be met with.

FIGS. 7 and 8 of the drawings illustrate the employment of crop feeders 53 that are in the form of wheels. The crop feeders 53 are, in fact, arranged in a very similar manner to the screen-like crop feeders 51 of the embodiment of FIGS. 5 and 6 of the drawings but it will be seen from FIGS. 7 and 8 that they are freely rotatably mounted on axles that are afforded by the substantially horizontally bent-over ends of tubes 54. The axles are connected by upwardly inclined portions of the tubes 54 to substantially vertical upper end portion of those tubes which, like the previously described shafts 45, are turnably received in sleeve-like bearing bushes 55 that are fastened to the corresponding supports 11 by brackets. The upper end portions of the tubes 54 are surrounded, above the bushes 55, by coil springs 56 whose lower ends are anchored to the bushes 55 themselves and whose upper ends are anchored to stops 56A mounted at substantially the upper extremities of the tubes 54. The springs 56 act to urge the tubes 54 resiliently in the directions D and E with the result that, when further stops that are not illustrated become effective, the crop feeders 53 occupy the positions illustrated in FIG. 7 of the drawings in which their general planes are rearwardly convergent with respect to the direction A in a manner analogous to that of the crop feeders 51 of the embodiment of FIGS. 5 and 6 of the drawings. The upper end of each tube 54 is surrounded, beneath the corresponding bush 55, by a helical compression spring 57 that bears between the lowermost end of the bush 55 concerned and an underlying annular stop 57A. Thus, while being able to move upwardly and downwardly through its bush 55, the upper end portion of each tube 54 is urged downwardly towards the ground surface by the corresponding spring 57 so that, consequently, the periphery of the wheel that affords the corresponding crop feeder 53 is also urged into contact with the ground surface.

In operation, the crop feeders or wheels 53 function in substantially the same manner as has already been described for the crop feeders or screens 51 but the feeders 53 have the additional advantage that there is very little tendency indeed for hay or other crop to adhere to them and their construction is such that they themselves tend to disentangle to some extent any entangled masses of crop that they may meet with. There is thus a still further reduction in entangled or knotted crop that is delivered rearwardly by the tines of the rake members 3 and 4 of the machine. It is not essential that the portion of each tube 54 that extends between the axle and the upper end thereof should be inclined to the vertical and, if preferred, it may extend in axial continuation of its upper end. In either case, the periphery of each crop feeder 53 preferably has teeth 58 as illustrated in FIGS. 7 and 8 of the drawings, the star teeth that are illustrated being effective but spring steel tine-like teeth (not illustrated) being equally satisfactory. The crop feeders or wheels 53 primarily have a crop feeding fuction and guide crop which they engage towards the vertical plane of substantial symmetry of the machine so that such crop will be picked up by the tines of the rake members 3 and 4 in very close proximity to that plane but, secondarily, the feeders 53 exert an initial disentangling effect upon the crop which they displace towards said plane. It is not, of course, the function of the crop feeders 53 to rake the hay or other crop since this function is fulfilled by the tine groups 19. The positions of the crop feeders or wheels 53 in front of the rake members 3 and 4 of the machine are such that they can never foul the tines 20 and 21 of those rake members. Each crop feeder 53 has an overall diameter which is between substantially 20% and substantially 40% of the overall diameter of one of the rake members 3 or 4, a figure of substantially 25% being preferred. It is preferred that the diameters and dispositions of the crop feeders or wheels 53 should be such that, when viewed in plan (FIG. 7), the paths traced by the tips of the tines 20 and 21 of the rake members 3 and 4 during movement in the directions B and C, respectively, should just intersect the rearmost ends of said feeders 53 when the general planes of those feeders extend substantially parallel to the direction A. This relationship is shown in broken lines in respect of one of the crop feeders 53 in FIG. 7 of the drawings and is such that the feeders 53 are located as closely as is possible in front of the rake members 3 and 4 without there being a danger of the feeders 53 fouling the tines 20 and 21 of those rake members.

FIGS. 9 and 10 of the drawings illustrate an embodiment in which two rearwardly convergent crop feeders 59 are provided, each feeder 59 being afforded by a plurality, such as five, of crop guiding elements in the form of spring steel rods 60. In fact, the two rods 60 that occupy corresponding positions in the two crop feeders 59 are formed integrally from a single length of spring steel rod that is preferably of circular cross-section, the integral assembly being generally of inverted U-shaped or channel-shaped configuration as seen in front or rear elevation. The web or base 61 of each U or channel is fastened, midway across its width, to a common support 62 that extends substantially horizontally parallel to the direction A, said support 62 substantially coinciding, as seen in plan view (FIG. 9), with the vertical plane of substantial symmetry of the machine that has been referred to previously. Vertical bolts or the like (not shown in detail) co-operate with bent parts of the webs or bases 61 of the spring steel rods 60 to secure those webs or bases to the support 62. In order to produce the rearwardly convergent relationship of the crop feeders 59 with respect to the direction A, the web or base 61 of each rod 60 is of greater length in a direction perpendicular to the direction A than is the web or base 61 that follows it in that direction. The support 62 is provided, near the front thereof with respect to the direction A, with a pair of upright lugs 63 and those lugs are turnably coupled to a horizontal pivot pin to a forked downward extension 64 at the center of a suspension tube 65 that extends substantially horizontally perpendicular to the direction A near the front of the machine considered in that direction. As seen in the plan view of FIG. 9 of the drawings, the opposite ends of the suspension tube 65 are in register with leading regions of the two supports 11, said tube 65 being bent over perpendicularly upwards at its opposite ends to form two upright portions 66. The upper ends of the two portions 66 can be fastened to, detached from, brackets at the bottom of the two supports 11 by corresponding quickly releasable couplings 67. The precise formation of the couplings 67 is not important but they could, for example, be afforded by blocks formed with transverse holes arranged to register with holes in limbs of the brackets carried by the supports 11, horizontal locking pins being provided for entry through the aligned holes. Whatever construction is provided for the quickly releasable couplings 67, they are usable to connect the crop feeders 59 quickly to, or to release them quickly from, the supports 11 of the frame 1 of the machine.

As illustrated in the side elevation of FIG. 10 of the drawings, the spring steel rods 60 extend downwardly from their integral junctions with the corresponding webs or bases 61 and are curved rearwardly with respect to the direction A. In fact, as can be seen in FIG. 9 of the drawings, the curvature is such that all five downwardly curved rods 60 of each crop feeder 59 are contained in a single plane that is obliquely inclined to the direction A. There may, of course, be a greater or lesser number of the rods 60 in accordance with the size of the machine of which they form parts and in accordance with the nature and condition of the crop that is to be dealt with. It is preferred that, as illustrated in FIG. 10 of the drawings, the lowermost free ends of tips of the curved rods 60 should be located at only a short distance above the ground surface since this enables any crop temporarily caught around any of the rods 60 to slide downwardly therealong and drop off the lowermost ends of those rods, this tending not to happen readily if the lowermost free ends or tips of the rods 60 make dragging contact with the ground surface. The rearward orientation of the lowermost free ends or tips of the rods 60 also tends to facilitate the rapid shedding therefrom of any temporarily adhering hay or other crop. A stop 68 is fastened to the top of the support 62 immediately in front of the lugs 63 and its upright limb co-operates with the suspension tube 65 in preventing the support 62 from turning downwardly in an anticlockwise direction about the substantially horizontal pivot pin, as seen in FIG. 10 of the drawings, so that the rear, in particular, rods 60 will be maintained in spaced relationship with the ground surface. The support 62 can, however, turn in a clockwise direction about its pivotal mounting as seen in FIG. 10 of the drawings if any of the rods 60 should meet with an obstacle on, or undulation in, the ground surface.

When a machine in accordance with the embodiment of FIGS. 9 and 10 of the drawings is in operation, its crop feeders 59 will function in the same general manner as has already been described for the crop feeders 51 of the embodiment of FIGS. 5 and 6 of the drawings. However, the crop feeders 59 can function in a superior manner under some circumstances because of the resilient construction of their rods 60 and the construction and arrangement of those rods 60 that facilitates the shedding therefrom of any temporarily adhering hay or other crop. The integral formation of corresponding rods 60 of the two crop feeders 59 tends to produce some vibration of those rods when the machine is in use and this vibration is effective in preventing semi-permanent adherence of crop to the rods 60 since it shakes such crop loose and allows it to slide rapidly downwards along the rods and fall off their lowermost ends. The widths of the webs or bases 61 are progressively less from the front to the rear of the crop feeders 59 and, consequently, successive rods 60 in the same direction are less resiliently supported than are their foregoing neighbours. This has the advantage that any hay or other crop that is stubbornly adhering to the ground surface or to stubble and that is not dislodged by one of the leading rods 60 can be pulled loose by one of the less resiliently mounted but further rearwardly disposed rods 60. The resilient vibration of the rods 60 also has some loosening effect upon entangled accumulations of crop that may be met with during the use of the machine.

As seen in FIG. 9 of the drawings, the general plane of the curved rods 60 of each crop feeder 59 is inclined to the vertical plane of substantial symmetry of the machine at an angle which should be between substantially 20° and substantially 50°, an inclination of substantially 35° being preferred. The gap that is left between the rods 60 that are at the rear ends of the two crop feeders 59 with respect to the direction A is, as in the preceding embodiments, sufficient to allow hay or other crop to pass therethrough without difficulty for engagement by the tines of the rake members 3 and 4. If a very large swath or windrow is to be formed, the quickly releasable couplings 67 can be undone and the whole assembly that includes the crop feeders 59 can then be temporarily removed from the remainder of the machine.

The inner curved crop feeder 3 of the embodiment of FIGS. 1 to 4 of the drawings may be provided in combination with any of the crop feeders that have been described with reference to FIGS. 5 to 10 of the drawings. Moreover, it is wihtin the scope of the invention to provide machines that comprise one or more features taken from one embodiment with one or more features taken from at least one other embodiment. The invention has been described in relation to haymaking machines that comprise a single pair of contra-rotating rake members 3 and 4 but is equally applicable to machines that have more than two pairs of contra-rotating rake members.

Although various features of the haymaking machines that have been described and/or that are illustrated in the accompanying drawings will be set forth in the following claims as inventive features, it is emphasised that the invention is not necessarily limited to those features and that it includes within its scope each of the parts of each haymaking machine that has been described, and/or that is illustrated in the accompanying drawings, both individually and in various combinations.

What we claim is:

1. A haymaking machine comprising a mobile frame and at least one pair of tined rake members supported on said frame, said rake members having outwardly extending tines and being rotatable about corresponding upwardly extending axes, driving means connected to rotate said members in relatively opposite directions about said axes, whereby crop is passed between said members during operation, two crop feeders being mounted on said machine and comprising a forward pair of feeders located adjacent the front of said rake members relative to the normal direction of tavel and a vertical plane of symmetry of said machine that extends between the axes of rotation of said rake members, a further pair of feeders being positioned to the rear of said forward pair and each pair of feeders comprising downwardly extending crop guides that correspond to said rake members.

2. A machine as claimed in claim 1, wherein each further feeder comprises a plurality of crop guiding elements.

3. A machine as claimed in claim 2, wherein said guiding elements are located above the rake members and within the paths traced by the outer tips of their tines, said forward feeders having guide elements located in front of said rake members.

4. A machine as claimed in claim 3, wherein said feeders and further feeders are mounted on a common tube support, one behind the other with respect to the direction of travel.

5. A machine as claimed in claim 1, wherein the circles traced by the tines of said rake members are contained in planes inclined to the ground at an angle of about 5°.

6. A machine as claimed in claim 1, wherein the tines of said rake members are selectively adjustable to at least two different operative positions relative to the remainders of those rake members and means retaining said tines in the selected position.

7. A machine as claimed in claim 1, wherein said machine has a working width of about 3 meters.

8. A machine as claimed in claim 1, wherein at least one crop guide member intended for use in the formation of at least one swath or windrow by said machine is positioned to the rear of said further feeders.

9. A haymaking machine comprising a mobile frame and at least one pair of tined rake members supported on said frame, said rake members having outwardly extending tines and being rotatable about corresponding upwardly extending axes to trace generally circular paths, driving means connected to rotate said members in relatively opposite directions about said axes, whereby crop is passed between said members during operation, two crop feeders being mounted on said machine adjacent the forward aspects of said rake members, said feeders being positioned between the axes of rotation of said rake members, when viewed in the direction of travel, and outside the forward portions of said paths to guide crop rearwardly, with respect to the normal direction of machine travel, to the tines of the rake members and between the axes of rotation of the rake members, said crop feeders normally extending in rearwardly convergent relationship with respect to the direction of travel.

10. A machine as claimed in claim 9, wherein said feeders are comprised of rods in pairs and said pairs are resiliently interconnected.

11. A machine as claimed in claim 9, wherein said feeders are located at least partly to the rear of a straight line interconnecting the lowermost points of circles traced by the tips of the tines of said rake members during rotation thereof.

12. A machine as claimed in claim 9, wherein said feeders comprise closed guide surfaces.

13. A machine as claimed in claim 9, wherein each feeder has crop guiding elements and said elements are orientated to guide crop over the feeders towards the rear.

14. A machine as claimed in claim 13, wherein some of the crop guiding elements are located adjacent the tines between said rake members and are orientated rearwardly with respect to the direction of travel.

15. A machine as claimed in claim 13, wherein said crop guiding elements of the crop feeders thereof are displaceable to different positions relative to said rake members and means adjusting said feeders to said positions.

16. A machine as claimed in claim 9, wherein said feeders are non-rotatable and at least a part of each feeder has a curved surface.

17. A machine as claimed in claim 16, wherein a feeder corresponds to each rake member and the center of curvature of the curved part of each feeder is substantially coincident with the axis of rotation of the corresponding rake members.

18. A machine as claimed in claim 17, wherein said curved part of each feeder subtends an angle of about 50° around the corresponding axis of rotation.

19. A machine as claimed in claim 9, wherein at least part of each feeder is spaced from a circle traced by the tips of the tines of one of said rake members during its rotation by a radial distance substantially 10% of the overall diameter of that rake member.

20. A machine as claimed in claim 9, wherein said two feeders are pivotally mounted on said frame.

21. A machine as claimed in claim 20, wherein said feeders are generally planar in formation and pivotable into positions in which their general planes are substantially parallel to the direction of travel.

22. A machine as claimed in claim 20, wherein said feeders are pivotable about corresponding non-horizontal pivotal axes located adjacent the fronts of the feeders.

23. A machine as claimed in claim 22, wherein said pivotal axes are contained in a plane substantially perpendicular to the direction of travel and extend in upwardly convergent relationship.

24. A machine as claimed in claim 20, wherein said feeders are pivotable about said pivotal axes against resilient opposition.

25. A machine as claimed in claim 9, wherein each feeder is substantially circular and rotatably mounted.

26. A machine as claimed in claim 25, wherein each feeder is rotatable about a substantially horizontal axis.

27. A machine as claimed in claim 26, wherein said feeders have peripheral teeth.

28. A machine as claimed in claim 9, wherein, as seen in plan view, further crop feeders are positioned inside circles traced by the tips of the tines of the two rake members during rotation thereof.

29. A machine as claimed in claim 9, wherein said feeders depend from connections to said frame and are displaceable against the opposition of spring means associated with said connections.

30. A haymaking machine comprising a mobile frame and at least one pair of tined rake members supported on said frame, said rake members having outwardly extending tines and being rotatable about corresponding upwardly extending axes, driving means connected to rotate said members in relatively opposite direction about said axes, whereby crop is passed between said members during operation, two crop feeders being positioned between the axes of rotation of the rake members, when viewed in the direction of travel, and the tines of said rake members extending outwardly from the rotary axes to trace circular paths and pass close to one another, adjacent a vertical plane of symmetry of the machine which plane is located between said axes of rotation, said feeders corresponding to said rake members and located outside circular paths traced by the inner ends of the tines of the corresponding rake members.

31. A machine as claimed in claim 30, wherein said feeders are non-rotatable and in rearwardly convergent relationship with respect to the direction of travel.

32. A machine as claimed in claim 30, wherein said feeders are located before a straight line interconnecting the axes of rotation of the two rake members with respect to the direction of travel.

33. A machine as claimed in claim 30, wherein each feeder is curved and subtends an angle of about 60° at the axis of rotation of the corresponding rake member.

* * * * *